(12) United States Patent
Schwarz et al.

(10) Patent No.: US 11,442,147 B2
(45) Date of Patent: Sep. 13, 2022

(54) TRANSMITTER UNIT AND LIDAR DEVICE FOR SCANNING A SCANNING REGION

(71) Applicant: Robert Bosch GmbH, Stuttgart (DE)

(72) Inventors: Hans-Jochen Schwarz, Stuttgart (DE); Klaus Stoppel, Mundelsheim (DE); Mazyar Sabbar, Zurich (CH); Stefan Spiessberger, Weinstadt (DE)

(73) Assignee: Robert Bosch GmbH, Stuttgart (DE)

( * ) Notice: Subject to any disclaimer, the term of this patent is extended or adjusted under 35 U.S.C. 154(b) by 861 days.

(21) Appl. No.: 16/294,087

(22) Filed: Mar. 6, 2019

(65) Prior Publication Data
US 2019/0277950 A1 Sep. 12, 2019

(30) Foreign Application Priority Data
Mar. 7, 2018 (DE) .......................... 102018203352.8

(51) Int. Cl.
*G01S 7/481* (2006.01)
*G01S 17/02* (2020.01)

(52) U.S. Cl.
CPC .......... *G01S 7/4815* (2013.01); *G01S 7/4817* (2013.01); *G01S 17/02* (2013.01)

(58) Field of Classification Search
CPC ...... G01S 7/4815; G01S 7/4817; G01S 17/02; G02B 3/02; G02B 3/06; H01S 5/02255; H01S 5/0261
See application file for complete search history.

(56) References Cited

U.S. PATENT DOCUMENTS

| 6,154,259 A | * | 11/2000 | Hargis | H04N 9/3132 353/69 |
|---|---|---|---|---|
| 2002/0172514 A1 | * | 11/2002 | Gabello | G01S 17/32 396/109 |
| 2005/0018726 A1 | * | 1/2005 | Dinger | H01S 5/40 372/36 |
| 2005/0205878 A1 | * | 9/2005 | Kan | F21V 5/002 257/82 |
| 2007/0241933 A1 | * | 10/2007 | Price | G01S 17/931 340/904 |
| 2008/0089371 A1 | * | 4/2008 | Reichert | H01S 5/4025 372/34 |
| 2013/0022061 A1 | * | 1/2013 | Shimokoshi | H01S 3/1001 372/6 |

(Continued)

FOREIGN PATENT DOCUMENTS

| CN | 202904126 U | * | 4/2013 | |
|---|---|---|---|---|
| CN | 107907962 A | * | 4/2018 | ......... G02B 27/0927 |

(Continued)

OTHER PUBLICATIONS

"Wikipedia, Aspheric Lens, Dec. 9, 2016" (Year: 2016).*
"Thorlabs, Acylindrical Lens, Apr. 10, 2016" (Year: 2016).*

*Primary Examiner* — Luke D Ratcliffe
*Assistant Examiner* — Woohyeong Cho
(74) *Attorney, Agent, or Firm* — Norton Rose Fulbright US LLP; Gerard Messina

(57) ABSTRACT

A transmitter unit of a lidar device for a scanning system includes at least two radiation sources in the form of semiconductor lasers for generating and emitting electromagnetic beams in the form of a line in a scanning region, the at least two radiation sources being individual emitters directly interconnected mechanically and electrically.

9 Claims, 4 Drawing Sheets

(56) References Cited

U.S. PATENT DOCUMENTS

| | | | |
|---|---|---|---|
| 2013/0143338 A1* | 6/2013 | Stephens, IV | H01S 5/405 |
| | | | 438/27 |
| 2014/0152813 A1* | 6/2014 | Wilks | G01S 7/497 |
| | | | 348/138 |
| 2015/0131080 A1 | 5/2015 | Retterath et al. | |
| 2017/0098923 A1 | 4/2017 | Chann et al. | |
| 2018/0062348 A1 | 3/2018 | Lee et al. | |

FOREIGN PATENT DOCUMENTS

| | | | |
|---|---|---|---|
| DE | 102010001113 A1 * | 7/2011 | G01S 17/36 |
| DE | 102015105393 A1 * | 10/2016 | |
| EP | 3605757 A1 | 2/2020 | |
| KR | 20170071395 A * | 6/2017 | |
| WO | WO-2018147453 A1 * | 8/2018 | G01S 7/481 |

\* cited by examiner

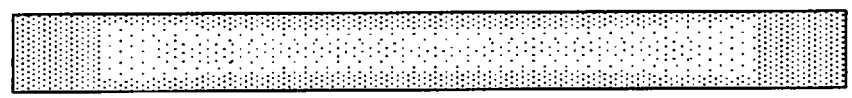
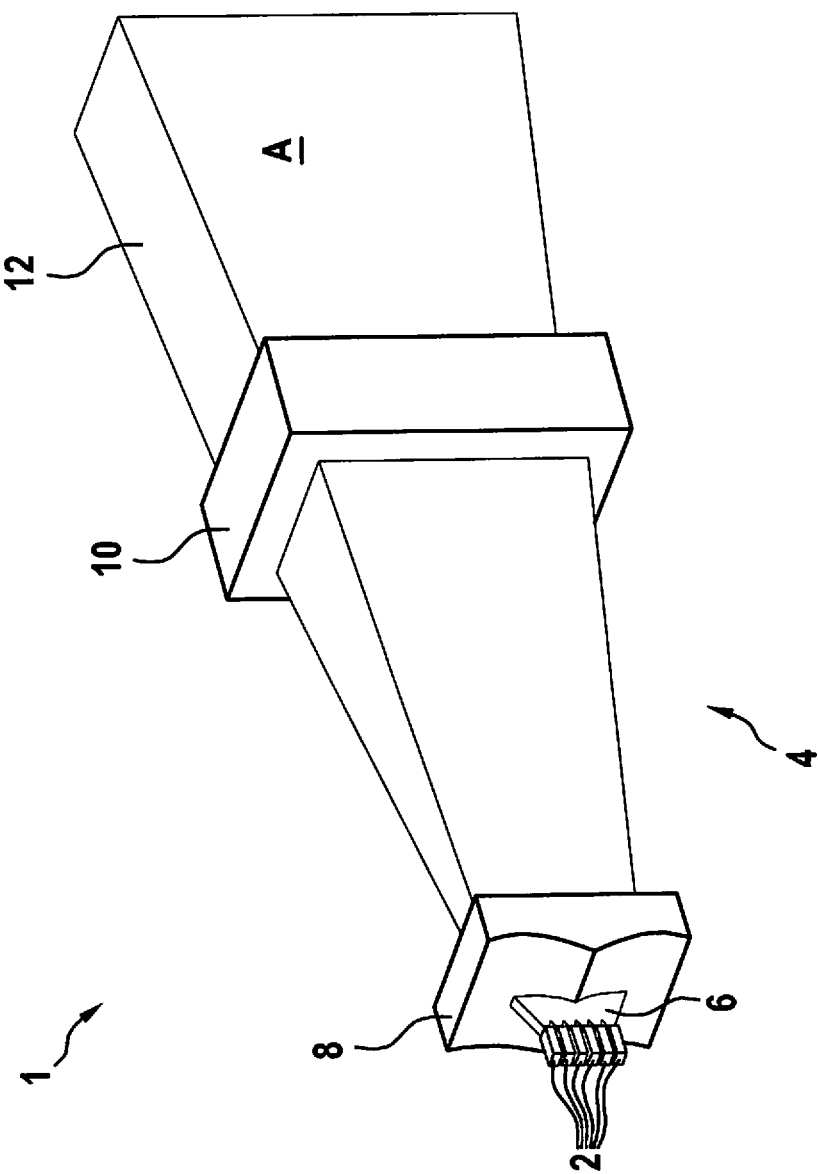

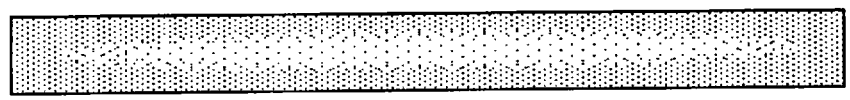
b)
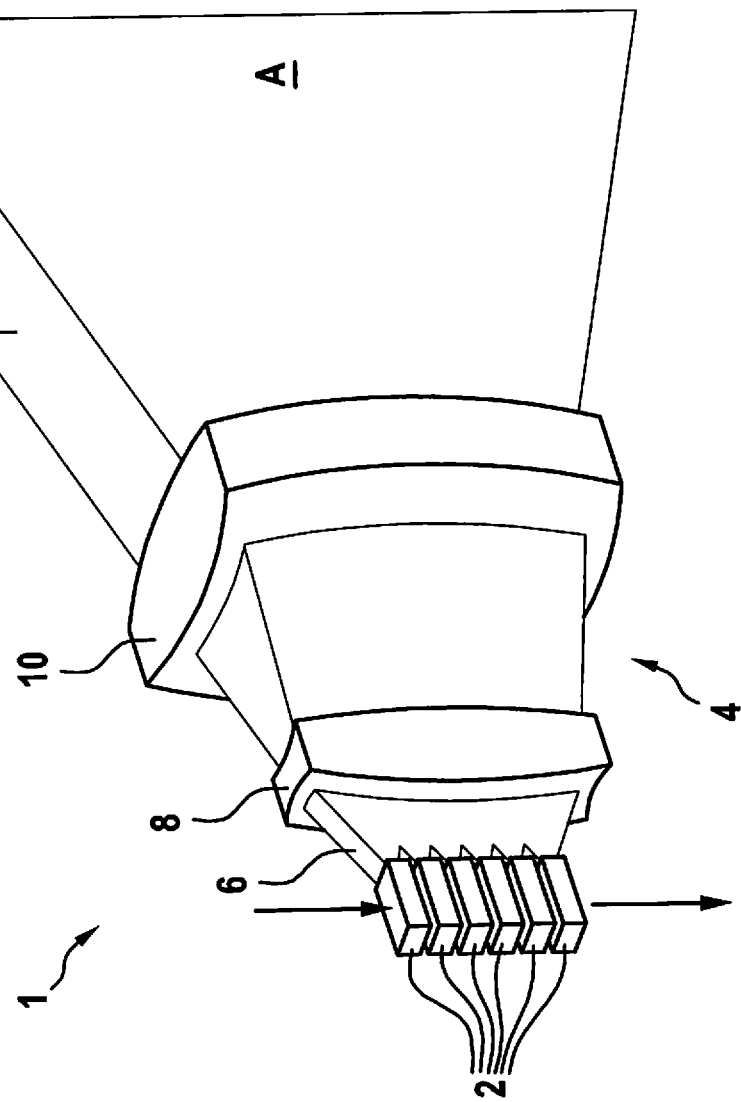
Fig. 3
a)

TRANSMITTER UNIT AND LIDAR DEVICE FOR SCANNING A SCANNING REGION

CROSS-REFERENCE TO RELATED APPLICATIONS

The present application claims priority under 35 U.S.C. § 119 to DE 10 2018 203 352.8, filed in the Federal Republic of Germany on Mar. 7, 2018, the content of which is hereby incorporated by reference herein in its entirety.

FIELD OF THE INVENTION

The present invention relates to a lidar device and a transmitter unit of the lidar device, including at least two radiation sources, which take the form of semiconductor lasers and are for generating and emitting electromagnetic beams in a scanning region.

BACKGROUND

So-called scanning lidar devices normally include stationary-mounted or horizontally rotating, transmitting and receiving units. In the case of a horizontally rotating set-up, a vertical line can be emitted, so that in the event of a complete rotation, the entire surrounding area is monitored. Semiconductor lasers are preferably used as radiation sources, due to the high standards for the power output of the emitted source, as well as for the robustness, size, and cost of the lidar device.

The attainable power output of semiconductor lasers is a function of, inter alia, the optical power density on an emission surface and/or a facet of the radiation source. If the power density is too high, this can ruin the radiation source. Therefore, in the case of semiconductor lasers taking the form of edge emitters, the emission surface is increased by widening the emitting edge. However, edge emitters cannot be produced in arbitrary widths, since unwanted, high-loss modes can otherwise be formed. Instead, individual emitters having widths of up to 400 μm are used. A plurality of emitters or radiation sources at a distance of, e.g., over 10 μm from each other are used as an integral semiconductor structure or as a so-called laser bar.

Besides the dimensioning of the laser geometry, the laser driver used for controlling the laser sources electronically is important for attaining high optical power outputs at simultaneously short laser pulse durations in the nanosecond range. In the case of the bar layout described, the electrical current required increases proportionally with the number of emission surfaces. This makes it increasingly difficult to provide a laser driver, which allows the required current to be switched in the range of a few nanoseconds.

In order to reduce the demand on the driver, individual semiconductor structures can be operated concurrently. Instead of positioning the individual emission surfaces in one semiconductor structure, the assembly is made up of individual semiconductor laser chips, which are positioned at a defined distance from each other. The advantage of increasing the spacing of the semiconductor structures is that each semiconductor structure can be supplied separately with current by a driver, and consequently, the total current required or the total power output can be distributed over a plurality of drivers. Using a suitable set-up of optical components, a laser line can be formed from a plurality of independent semiconductor structures and emitted into the surrounding area. However, in the case of such a parallel layout of a plurality of semiconductor structures, the dimensions and, in particular, the overall height of the transmitter unit increase. In this manner, the beam distribution resulting from this can have a greater beam quality factor and therefore makes the design of the beam-shaping optics more difficult. In order to achieve the specification of uniform line illumination, the produced beams of the individual radiation sources are typically formed separately with the aid of a plurality of individual lenses or a lens array.

SUMMARY

Example embodiments of the present invention provide a simplified transmitter unit for a scanning lidar device, which combines advantages of laser bars with advantages of simultaneously controlled laser diodes and consequently provides the option of achieving uniform line illumination, using simple optical elements.

According to one aspect of the present invention, a transmitter unit of a lidar device includes at least two radiation sources, which take the form of semiconductor lasers and are for generating and emitting electromagnetic beams into a scanning region, the at least two radiation sources being individual emitters interconnected directly mechanically and electrically.

A direct mechanical and electrical connection of the individual emitters allows an optimized combination of laser geometry and optics to be implemented for simplified generation of a uniform laser line having a high power output. The transmitter unit is preferably scalable and can therefore be expanded by additional radiation sources, as needed.

The radiation sources can be positioned mechanically in series. For example, one or more rows of radiation sources positioned in parallel with each other can be used for generating electromagnetic beams. For example, the radiation sources can be directly interconnected electrically and mechanically, using soldered connections. In this manner, the distances between the individual semiconductor structures or radiation sources can be set particularly small, so that the use of complex, channel-specific lenses or lens arrays can be eliminated. Instead, the radiation pattern of the laser stack or transmitter unit can already be influenced by individual lenses in such a manner that uniform line illumination can be generated.

Using the transmitter unit of the present invention, advantages of a compactly formed laser bar having simplified beam-shaping can be combined with advantages of separate, parallelly controlled laser diodes having less stringent requirements for a driver.

For example, the radiation sources can be connected electrically in parallel or in series at the electrical connecting pins or electrical contacts. In this context, the electrical connecting pins or electrical contacts of the radiation sources can be used as mechanical connections.

According to an example embodiment, the transmitter unit includes beam-shaping optics or generating optics, which are positioned in the optical path of the generated beams and include at least one optical element. Due to the compact size of the transmitter unit, the line characteristic for illuminating an environment or a scanning region can already be produced, using individual lenses. The elimination of microlenses allows beam-shaping optics having lower tolerance requirements to be used.

According to an example embodiment, the at least one optical element is an aspherical lens or a diffractive optical element, a so-called Powell lens or a diffractive optical element, which produces the uniform line distribution in the vertical direction. A second aspherical lens produces the necessary horizontal collimation. In this context, the distance between the collimating lens and radiation source can be selected to render the set-up safe for the eyes at the outlet.

According to an example embodiment of the present invention, the transmitter unit is very compact with the beam-shaping optics having two specifically shaped, aspherical lenses. In this connection, the intensity distribution emitted by the laser set-up is initially shaped by a first aspherical lens in such a manner that, besides the uniform line distribution in a vertical plane, a widening is achieved horizontally. A second aspherical lens subsequently provides for the required horizontal collimation. This example embodiment can be built particularly compactly.

According to an example embodiment of the transmitter unit, the at least two radiation sources are directly interconnected mechanically and electrically by soldered connections. The radiation sources of the transmitter unit implemented as semiconductor structures can be positioned mechanically in series. For example, the semiconductor chips can be soldered directly on top of each other. In this manner, a particularly compact transmitter unit can be achieved.

According to an example embodiment of the transmitter unit, the at least two radiation sources are surface emitters or edge emitters stacked or positioned adjacent to each other. This can allow, for example, available semiconductor chips to be used for manufacturing a transmitter unit. Surface emitters or edge emitters can be directly interconnected mechanically and electrically as a function of a desired illumination characteristic of the lidar device.

According to an example embodiment, the transmitter unit includes at least one driver for electrically controlling the at least two radiation sources. In this manner, the radiation sources can be regulated electrically by the at least one driver. In particular, a beam intensity of the electromagnetic beams generated can be adjusted and stabilized by the at least one driver.

According to an example embodiment of the transmitter unit, the at least two radiation sources are connected electrically to the at least one driver by a series circuit. The series connection of the radiation sources allows the transmitter unit to be operated already by a laser driver. If the radiation sources are connected in series, the driver need only supply the peak current needed by an individual emitter and is therefore more cost-efficient.

According to a further aspect of the present invention, a lidar device is provided for scanning a scanning region defined by a vertical and a horizontal scanning angle, using electromagnetic beams. The lidar device includes at least one transmitter unit as described for generating electromagnetic beams and for distributing or deflecting the electromagnetic beams along at least the vertical scanning angle. At least one receiving unit of the lidar device is used for receiving beams reflected by at least one object located in the scanning region. In addition, the lidar device includes at least one evaluation unit for evaluating the received, reflected beams.

The beams, which are generated by the transmitter unit and are generated at a distance from an optical axis of the generating optics, exhibit an emission angle after passing through generating optics. The emission angle or the transmission angle is a function of, in particular, the optical characteristics of the generating optics and the distance from the optical axis. Beams formed in such a manner can subsequently be emitted from the lidar device directly or via a deflection unit, into the scanning region.

If an object is located in the scanning region, then the beams formed and emitted are reflected by the object. At least one reflected laser pulse or beam can be received and detected by the receiving unit. To this end, the receiving unit can include receiving optics, which guide the at least one laser pulse onto a detector.

In the case of the lidar device of the present invention, the transmitter unit is constructed particularly compactly and inexpensively. This is achieved by directly stacking the semiconductor emitters or the radiation sources. In this context, the radiation sources can be in direct bodily contact with each other. Preferably, the radiation sources can be coupled to each other by chemical bonds or mechanical connections. Besides the bodily contact between the radiation sources, the chemical bond or mechanical connection can also produce an electrical contact for electrical control of the radiation sources by at least one driver.

The particularly compact set-up of the individual emitters similar to semiconductor bars allows the generating optics to be built in a particularly simple manner. In particular, complex lens arrays for shaping the generated beams can be dispensed with.

The individual radiation sources are preferably connected electrically to the driver in a series circuit. Through this, the maximum current to be supplied by the driver is less in comparison with a parallel circuit, which means that the driver can be manufactured in a technically simpler manner.

In the following, preferred example embodiments of the present invention are explained in greater detail in light of highly simplified, schematic representations of figures in which identical structural elements have, in each instance, the same reference numerals.

BRIEF DESCRIPTION OF THE DRAWING

FIGS. 1-3 show schematic views of a transmitter unit according to example embodiments of the present invention.

DETAILED DESCRIPTION

Figure 1:
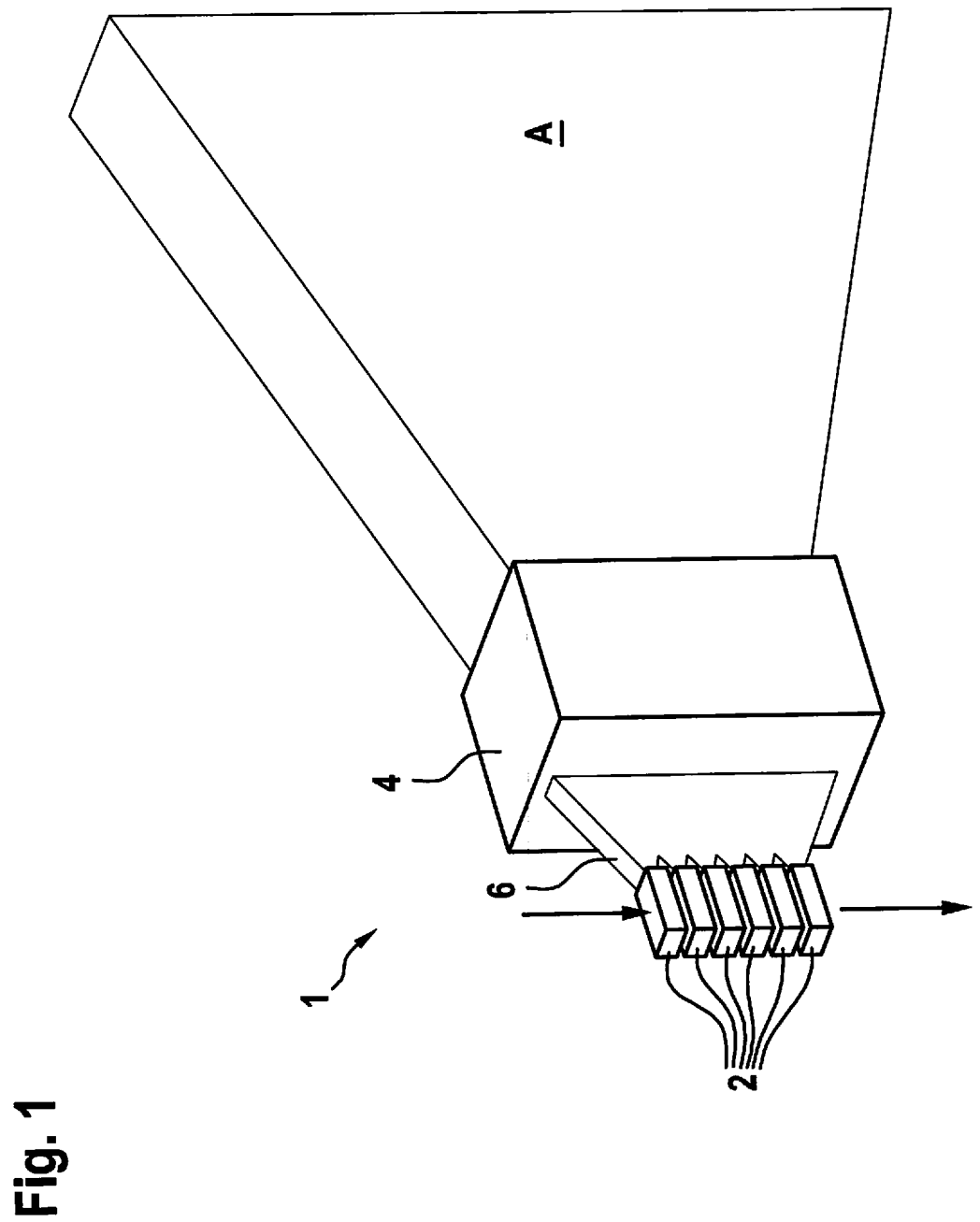

A schematic representation of the principle of a transmitter unit 1 for generating a laser line, using individual lasers connected in series, is shown in FIG. 1. For the sake of simplicity, the driver, as well as the detailed electronic control of radiation sources 2, are not shown.

Transmitter unit 1 includes six radiation sources 2 configured as edge emitters, positioned one above the other in a vertical direction, and interconnected electrically in series. In this connection, the arrow illustrates a flow of current through serially connected radiation sources 2. The distance between two consecutive emission surfaces of radiation sources 2 resulting from the stacking, the so-called pitch, can be, for example, 100 μm. Thus, with 6 individual emitters, the overall height is approximately 0.5 mm.

The direct or stacked set-up of radiation sources 2 allows the emission surfaces to be positioned particularly close to each other. In this case, in comparison with a macroscopically expanded set-up of individual emitters, lens arrays can therefore be dispensed with, and the advantages of macroscopic lenses can be utilized.

Part (a) of Figure shows a schematic view of a transmitter unit 1 according to an example embodiment. Here, a Powell lens 8 is a first lens 8 and takes on the task of beam-shaping in the vertical direction, as well as homogenization of the beams 6 produced. A second lens 10 downstream from Powell lens 8 collimates the beams in the horizontal direction.

The intensity distribution of the shaped beams 12 emitted into sampling region A, as they occur at a 200 m distance from the laser source, is shown in part (b) of FIG. 2. In this context, a vertical divergence angle of approximately 20° and a horizontal divergence angle of approximately 0.2° are produced.

Part (a) of FIG. 3 shows a schematic view of a transmitter unit 1 according to an example embodiment, in which a lens 8, which has a biconvex contour in the vertical direction, is situated at a distance of, for example, 15 mm from the emission surfaces of radiation sources 2. This homogenizes the non-uniform, vertical intensity distribution of the beams 6 generated by radiation sources 2 (rectangular profile). In addition, lens 8 also has a biconcave contour in the horizontal direction, by which an additional horizontal widening is forced. In comparison with the example embodiment traced in FIG. 2, the objective of this widening is to obtain a more compact design, which continues to satisfy eye safety requirements. The lens or optical element 10 subsequently provides for the necessary horizontal collimation at a total distance of approximately 40 mm from the emission surfaces of radiation sources 2.

The intensity distribution of the shaped beams 12 emitted in sampling region A, as they occur at a 200 m distance from the laser source, is shown in part (b) of FIG. 3. In this context, a vertical divergence angle of approximately 20° and a horizontal divergence angle of approximately 0.2° are produced.

Figure 4:
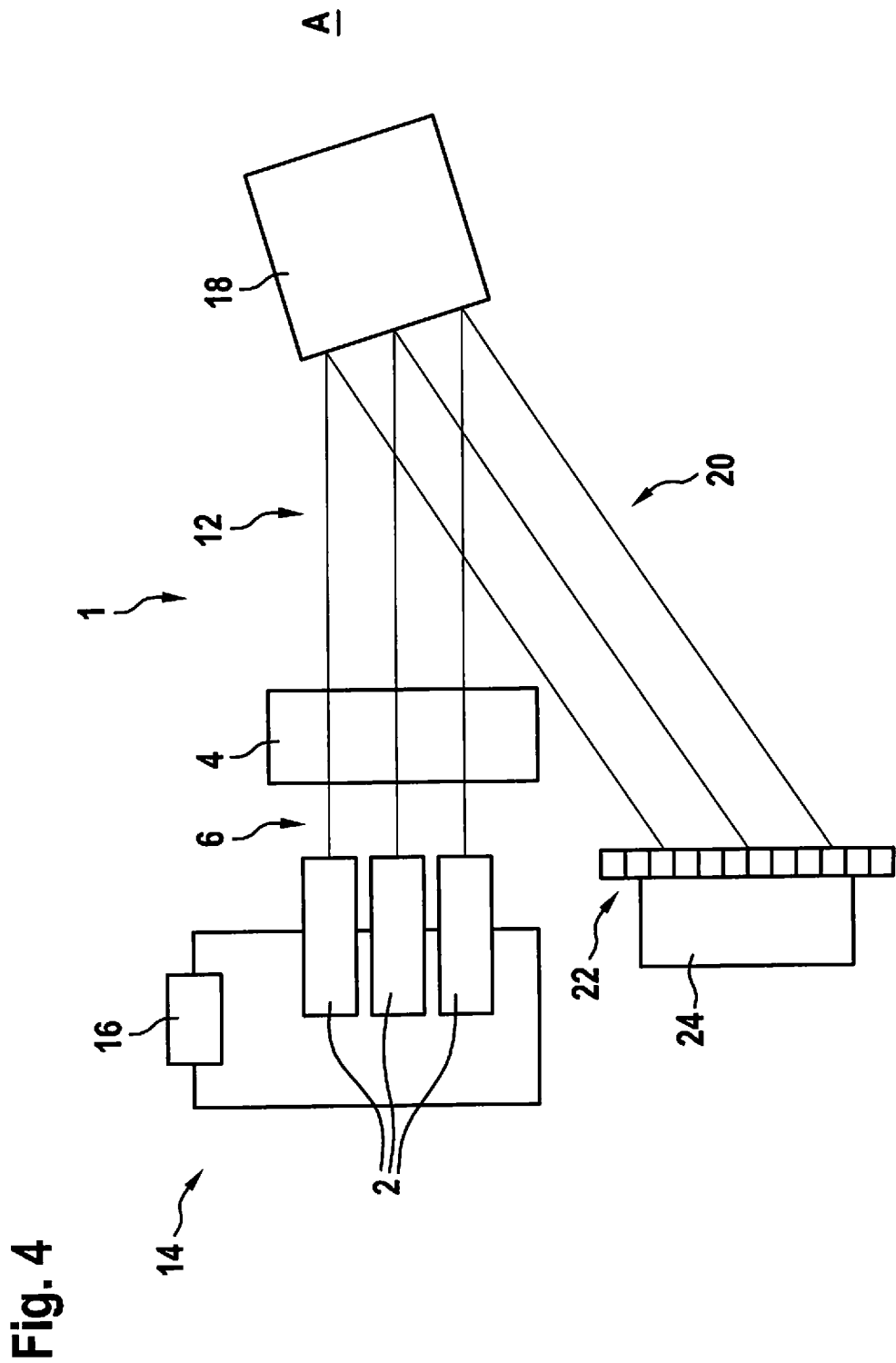
FIG. 4 a schematic representation of a lidar device according to an example embodiment of the present invention.

A schematic representation of a lidar device 14 according to an example embodiment is shown in FIG. 4. Device 14 includes a transmitter unit 1 having three radiation sources 2 operated in series. Radiation sources 2 are controlled electrically by a driver 16. The beams 12 shaped by generating optics 4 are emitted into scanning region A. Beams 20 reflected by an object 18 can subsequently be received by a receiving unit 22 and evaluated by an evaluation unit 24. Receiving unit 22 can be, for example, a detector. For example, a so-called time of flight analysis can be carried out by evaluation unit 24 to ascertain a distance of object 18.

What is claimed is:

1. A transmitter of a LIDAR device, comprising:
   at least two individual semiconductor lasers, which are directly interconnected mechanically and electrically in series, and which are configured to generate and emit electromagnetic beams in a scanning region;
   wherein the at least two semiconductor lasers are surface emitters or edge emitters stacked or positioned adjacent to each other,
   wherein a first lens is a Powell lens for shaping the beams in a vertical direction, and wherein a second lens, which is downstream from the Powell lens, collimates the beams in a horizontal direction,
   wherein a vertical divergence angle is greater than a horizontal divergence angle, and
   wherein the first lens includes an aspherical lens or a diffractive optic lens, which has a biconvex contour in the vertical direction, and in which the first lens includes a biconcave contour in the horizontal direction, for providing an additional horizontal widening, for obtaining a more compact configuration.

2. The transmitter of claim 1, wherein the vertical divergence angle is about 20° and the horizontal divergence angle is about 0.2°.

3. The transmitter of claim 1, wherein the first lens is situated at a distance from emission surfaces of the lasers, for homogenizing a non-uniform, vertical intensity distribution of the beams generated by the lasers, and wherein the second lens provides for the horizontal collimation at a specific distance from the emission surfaces of the lasers.

4. The transmitter of claim 1, wherein the at least one beam-shaping optic includes a beam homogenizing aspherical lens and a collimating aspherical cylindrical lens downstream from the aspherical lens relative to a direction of the emission.

5. The transmitter of claim 1, wherein the interconnection is by soldered connections.

6. The transmitter of claim 1, wherein the at least two semiconductor lasers are surface emitters or edge emitters stacked or positioned adjacent to each other, in a vertical direction, wherein a distance between two consecutive emission surfaces, or pitch, is about 100 μm.

7. The transmitter of claim 1, further comprising:
   at least one driver, wherein the at least two semiconductor lasers are electrically controllable by the at least one driver.

8. The transmitter of claim 7, wherein the at least two semiconductor lasers are connected electrically to the at least one driver by a series circuit.

9. A LIDAR scanner for scanning a scanning region defined by a vertical and a horizontal scanning angle using electromagnetic beams, comprising:
   a transmitter, which includes at least two individual semiconductor lasers directly interconnected mechanically and electrically in series, and which is configured to generate and emit the electromagnetic beams in the scanning region such that the electromagnetic beams are distributed or deflected along at least the vertical scanning angle;
   a receiver to receive beams reflected by at least one object located in the scanning region; and
   a processor to evaluate the received reflected beams;
   wherein the at least two semiconductor lasers are surface emitters or edge emitters stacked or positioned adjacent to each other,
   wherein a first lens is a Powell lens for shaping the beams in a vertical direction, and wherein a second lens, which is downstream from the Powell lens, collimates the beams in a horizontal direction,
   wherein a vertical divergence angle is greater than a horizontal divergence angle, and
   wherein the first lens includes an aspherical lens or a diffractive optic lens, which has a biconvex contour in the vertical direction, and which is situated at a distance from emission surfaces of the lasers, for homogenizing a non-uniform, vertical intensity distribution of the beams generated by the lasers, and in which the first lens includes a biconcave contour in the horizontal direction, for providing an additional horizontal widening, for obtaining a more compact configuration, and wherein the second lens provides for the horizontal collimation at a specific distance from the emission surfaces of the lasers.

* * * * *